US006542993B1

United States Patent
Erfani

(10) Patent No.: US 6,542,993 B1
(45) Date of Patent: Apr. 1, 2003

(54) SECURITY MANAGEMENT SYSTEM AND METHOD

(75) Inventor: Shervin Erfani, Red Bank, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/267,856

(22) Filed: Mar. 12, 1999

(51) Int. Cl.[7] .............................. H04L 9/00; G06F 9/44
(52) U.S. Cl. ..................... 713/201; 713/200; 713/151; 713/153; 709/200; 709/310
(58) Field of Search ................... 713/151, 152, 713/153, 200, 201; 709/200, 220, 225, 227, 228, 310, 315, 316, 331, 332

(56) References Cited

U.S. PATENT DOCUMENTS

| | | | | |
|---|---|---|---|---|
| 5,933,503 A | * | 8/1999 | Schell et al. ................. | 713/187 |
| 5,968,176 A | * | 10/1999 | Nessett et al. ............... | 713/201 |
| 6,106,569 A | * | 8/2000 | Bohrer et al. .................. | 705/7 |
| 6,212,633 B1 | * | 4/2001 | Levy et al. .................. | 380/283 |

OTHER PUBLICATIONS

Muftic et al., *SecurityArchitecture for Open Disitributed Systems*, pp. 163–169, 1993, Chicester, UK, John Wiley and Sons.

Feghhi et al., *Digital Certificates: Applied Internet Security*, pp. 22–26, Sep., 1998, Addison–Wesley.

Stallings, *Network and Internetwork Security; Principles and Practice*, pp. 4–14, 1995, Englewood Cliffs, NJ, Prentice–Hall.

Sherwood, "SALSA: A Method for Developing the Enterprise Security Architecture And Strategy", *Computers & Security*, pp. 501–506, 1996, vol 15.

\* cited by examiner

*Primary Examiner*—Ly V. Hua

(57) ABSTRACT

A comprehensive system and method for managing security in an electronic network. The method includes the steps of providing a plurality of security services, providing a plurality of security mechanisms, and linking the services and mechanisms with a plurality of security management functions. The method supports all associated security protocols in the electronic network while maintaining transparency for message exchange. Advantageously, the method of the invention readily provides compatibility with a plurality of environments, network types, and technologies. The method provides five functional hierarchical layers, one protocol handling access to the layers, and includes a security management information base segmented according to the five functional layers. The five functional layers are, from the base, fundamental security primitives, security mechanisms, security services, security management functions, and security policies. Each layer can contain several independent modules. Exchange of messages between modules in a layer and between layers is provided. An implementing system facilitates the method in an electronic network, illustratively including an electronic processing environment.

8 Claims, 7 Drawing Sheets

SECURITY MANAGEMENT SYSTEM AND METHOD

BACKGROUND OF THE INVENTION

1. Field of the Invention

This invention relates to a security management system in an electronic network and a method for providing a plurality of security functions and, in particular, to such a system and method providing a plurality of security services and using a plurality of security mechanisms.

2. Discussion of the Related Art

Existing electronic network security services and products provide methods and mechanisms that are aimed at satisfying user needs for security. Some of these services and products claim a layered architecture, or multiple overlapping security methods or mechanisms.

Nevertheless, none of the existing methods and mechanisms comprises a logical architecture for complete end-to-end network security. That is, some needs are not provided for, or are not provided for in an effective, efficient way. For example, support for electronic commerce should provide secure support for all associated protocols.

SUMMARY OF THE INVENTION

According to one aspect of the invention, a method of managing security in an electronic network includes the steps of providing a plurality of security services, providing a plurality of security mechanisms, and linking the services and mechanisms with a plurality of security management functions.

It is a feature of the invention that the method supports all associated security protocols in the electronic network while maintaining transparency for message exchange.

Advantageously, the method of the invention readily provides compatibility with a plurality of environments, network types, and technologies.

In a preferred implementation of the invention, the method for providing electronic network security provides five functional hierarchical layers, one protocol handling access to the layers, and includes a security management information base segmented according to the five functional layers. The five functional layers are, from the base, fundamental security primitives, security mechanisms, security services, security management functions, and security policies. Each layer can contain several independent modules. Exchange of messages between modules in a layer and between layers is provided.

According to a second aspect of the invention, a security system for an electronic network includes a plurality of electronic processor-based devices organized in a plurality of hierarchies and/or layers. The devices provide a plurality of security services and a plurality of security mechanisms. The plurality of electronic processor-based devices also links the plurality of security services and the plurality of security mechanisms with a plurality of security management functions.

It is also a feature of this aspect of the invention that the system supports all associated security protocols in the electronic network while maintaining transparency for message exchange. Advantageously, the system of the invention readily provides compatibility with a plurality of environments, network types, and technologies.

In a preferred implementation of this aspect of the invention, the system for providing electronic network security includes devices in an electronic computational environment providing five functional hierarchical layers, includes one protocol manager handling access to the layers, and includes a security management information base segmented according to the five functional layers. The five functional layers are, from the base, fundamental security primitives, security mechanisms, security services, security management functions, and security policies. Each layer can contain several independent modules. Exchange of messages between modules in a layer and between layers is provided.

BRIEF DESCRIPTION OF THE DRAWINGS

Further features and advantages of the present invention will become apparent from the follwing detailed description, taken together with the drawings, in which.

DETAILED DESCRIPTION

The present invention provides a comprehensive modular security management system (SMS) for an electronic network that can be enterprise-wide for a user entity. The proposed SMS can accommodate new security services as well as new techniques and technologies. It provides a common platform for next-generation products, while adhering to standard requirements and interfaces. The invention uses a layered functional architecture that makes it feasible to compose software applications from products developed and/or modified by different suppliers at different times.

Also facilitated are the following features:

Many security mechanisms with different efficiency and different level of security A wide range of management functions Full integration with Network Management Systems (NMS)

Security policies access from NMS

Abbreviated security management from NMS

Efficient use of different security mechanisms by different security services

Transparency to users and applications

Easy applicability to any type of operational environment

Scaleability even for a very large-size customer base

Adaptability for network changes, enhancements, and new policies.

The following definitions are given for reference.

Security services are remedies and countermeasures by which security threats are countered. Each security service uses one or more security mechanisms to counter security attacks or threats. In today's network, various stand-alone security servers and/or proxies are used to provide some sort of piecemeal security, such as an authentication server or an authorization and access controller. Security mechanisms are effective techniques and schemes used to implement a given security service with different degrees of complexity. For example, an abstract service like data confidentiality might be implemented using either the secret key data encryption mechanism or public key data encryption scheme.

In most practical cases, a combination of security mechanisms is needed for implementing an effective security service. For example, an authentication service can be implemented with either strong mechanisms or with weak mechanisms (low, medium, or high security). In practice, it is quite common that more than one security service use the same mechanism.

Figure 7:
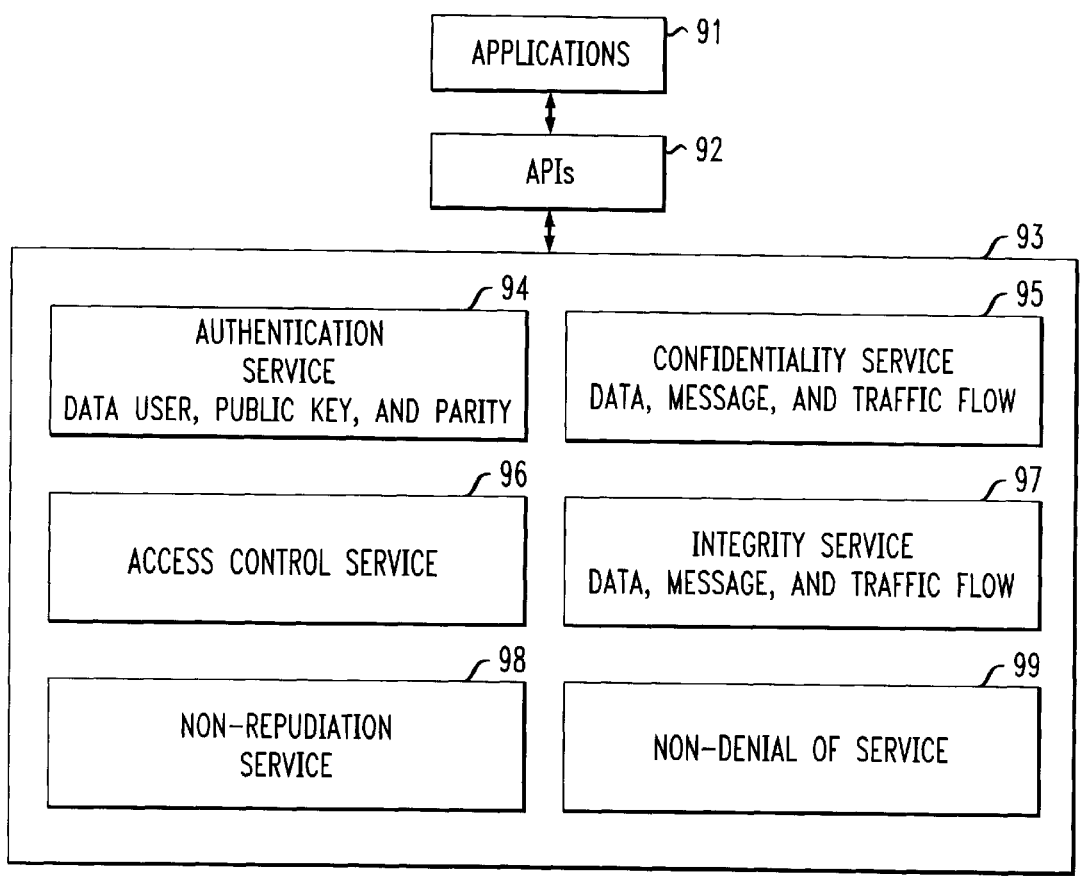
FIG. 7 is a block diagrammatic illustration of the invention employing the implementations of FIGS. 1–6 and having one or more application interfaces with specific application(s) that are supported by the security management system and method.

Table 1 indicates applicable mechanisms that may be used to implement a service.

network 27. The electronic network 23 is connected through the protocol handler 21 to the layered or hierarchical elements of a modular security management system. That system includes the topmost, or fifth, layer 11 consisting of security policy requirements, also including business requirements. The system also includes the subordinate security management function layer 13, to the extent separate from layer 11. This layer 13 is concerned with security aspects which are outside normal scope of security services, but which are needed to support and control security services layer 15 and the security mechanisms layer 17, which are the next two subordinate layers, in that order. Subordinate to all the foregoing layers is the base, or first, layer 19 of fundamental security mathematical functions. All of these layers will be described in more detail hereinafter. Each of these layers 11–19 uses its own segment 31–19 of a security management information base. The layers 11–19 are linked together, either through protocol handling function unit 21, or directly, as shown in FIG. 7.

Figure 2:
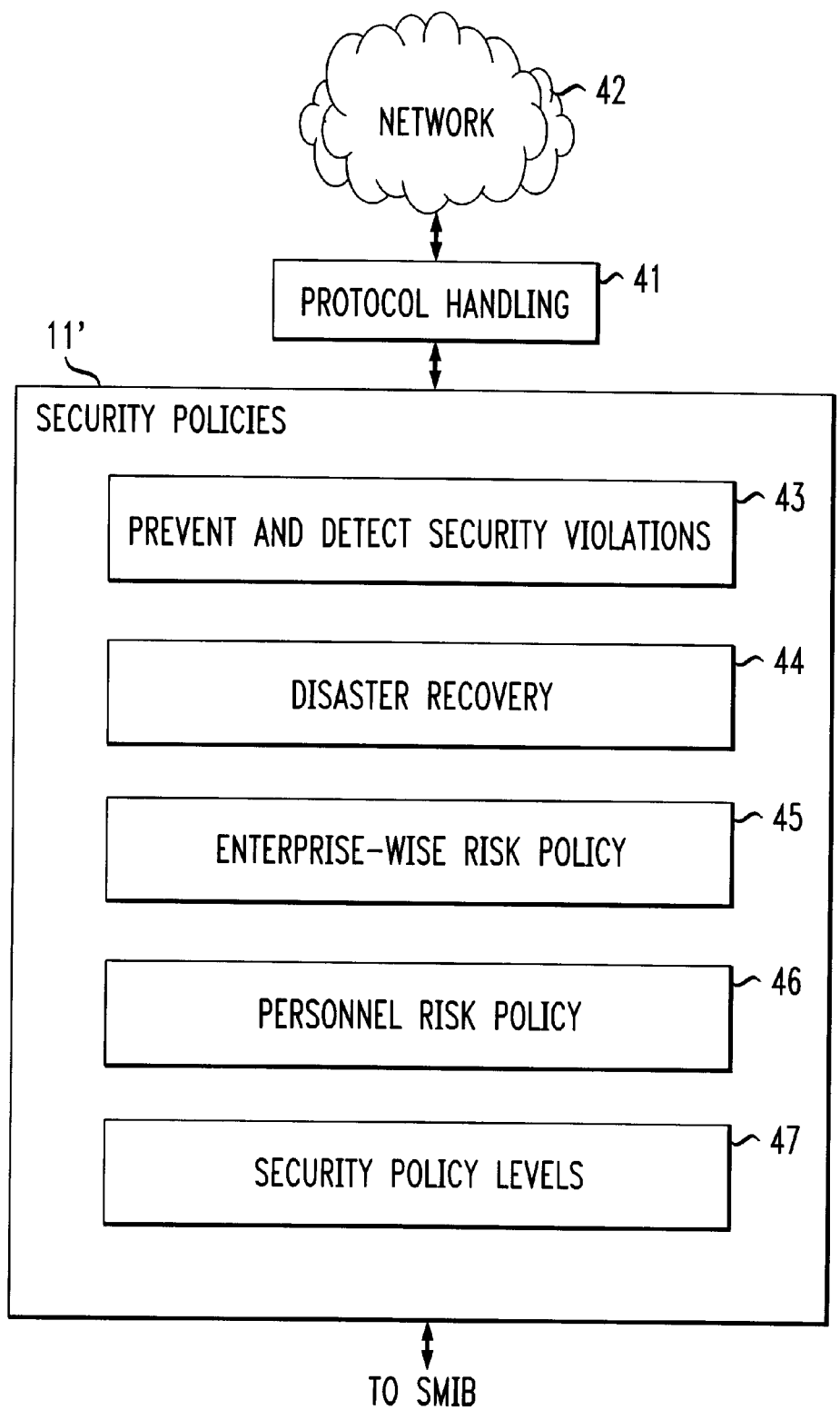
FIG. 2 is a block diagrammatic showing of a preferred implementation of the security policy portion of the system according to FIG. 1.

FIG. 2 shows the modules of security policy layer 11' selected for a particular environment including a protocol handling module 41 and an electronic network 42. They include module 43 for preventing and detecting security violations, module 44 facilitating disaster recovery, module 45 maintaining enterprise-wide risk policy, module 46 establishing a personnel risk policy, and module 47 establishing security policy levels.

All of the foregoing modules can be structured as known to those of ordinary skill in the electronic security art. Note

TABLE 1

Security Mechanisms for Implementing Security Services

| SERVICE MECHANISM | CONFIDENTIALITY & PRIVACY | INTEGRITY & PROTECTION | ACCESS CONTROL & AVAILABILITY | NON-REPUDIATION & ACCOUNTABILITY | AUTHENTICATION |
|---|---|---|---|---|---|
| Access Control Mech. | Y | | Y | | Y |
| Digital Signature | | Y | | Y | Y |
| Encryption Mech. | Y | Y | | Y | Y |
| One-Way Hash (OWH) | | Y | | | |
| Certification | | | Y | Y | Y |
| Password Techniques | Y | Y | | Y | Y |
| MAC | Y | Y | | Y | Y |
| Key Exchange/ Generation | Y | Y | | | Y |

Note: Y means "yes", it applies.

A fundamental property of SMS is to be used as a comprehensive autonomous security server, as it may provide security to multiple applications at the same time. The format of exchanging messages and data used by various applications tends to vary from application to application. In the SMS, a protocol handling function preferably is provided across all the five layers, or at least across the top four hierarchical layers, for communication with the users, agents, and the operation environment.

Figure 1:
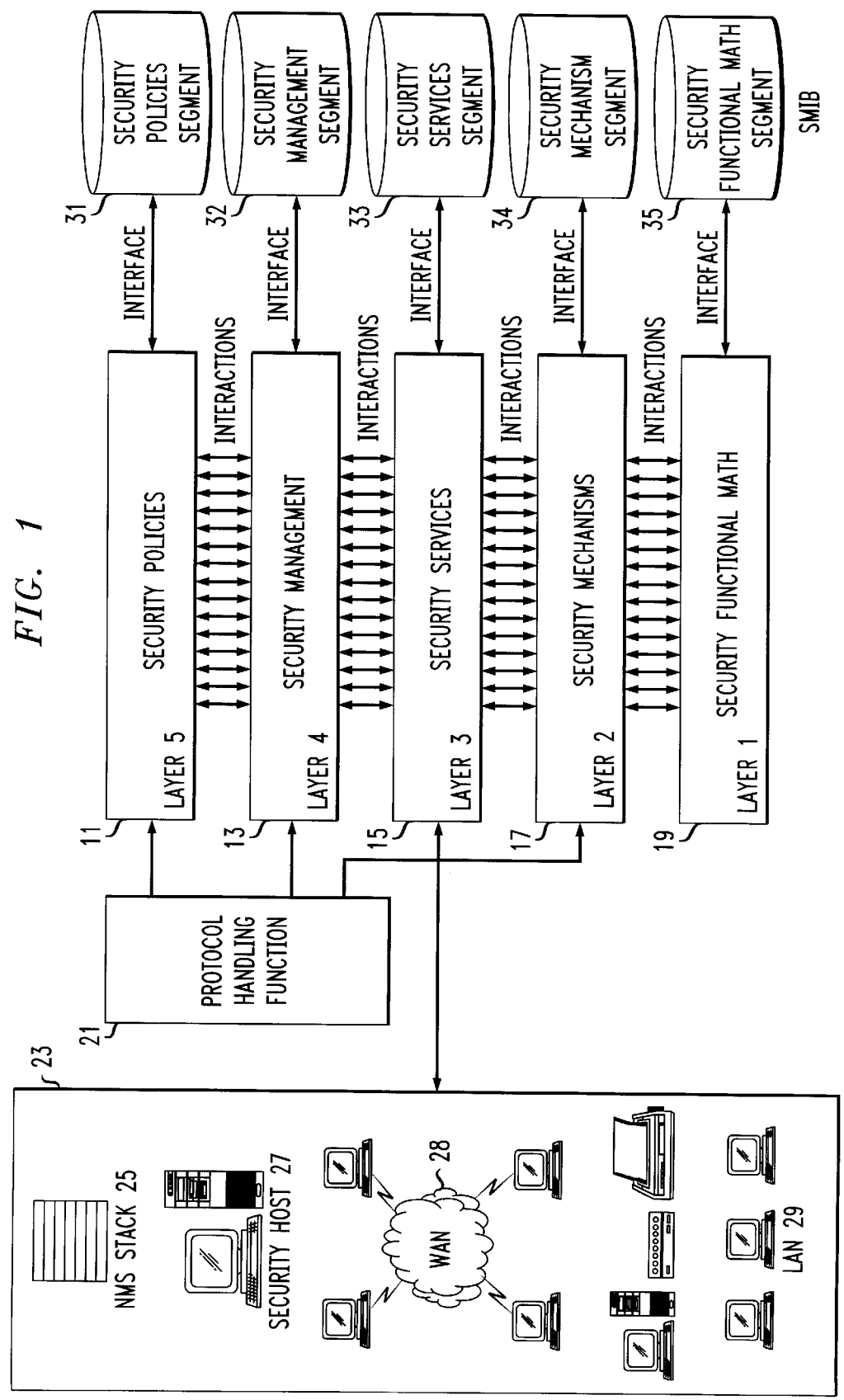
FIG. 1 is a block diagrammatic showing of a preferred implementation of a security system according to the invention.

In more detail, in FIG. 1, an electronic network 23 is provided with a modular security system according to the invention. The electronic network 23 illustratively includes the network management system stack 25, the security host 27, the wide-area network (WAN) 28, and the local area that rule-based techniques can be used as part of the security violation detection and prevention module 43 to detect intrusion by observing events and applying a set of rules to make a decision whether a given pattern of activities is suspicious. Rules can also be defined that identify suspicious behavior. Clearly, "security violation detection" and "security violation prevention" modules can benefit from expert system technology. Rule-based threat detection does not require knowledge of security vulnerabilities within security domain—it is based on observing the past pattern and assuming that the future will be like the past. However, past experience shows that a large number of rules are required for implementing this approach effectively.

Figure 3:
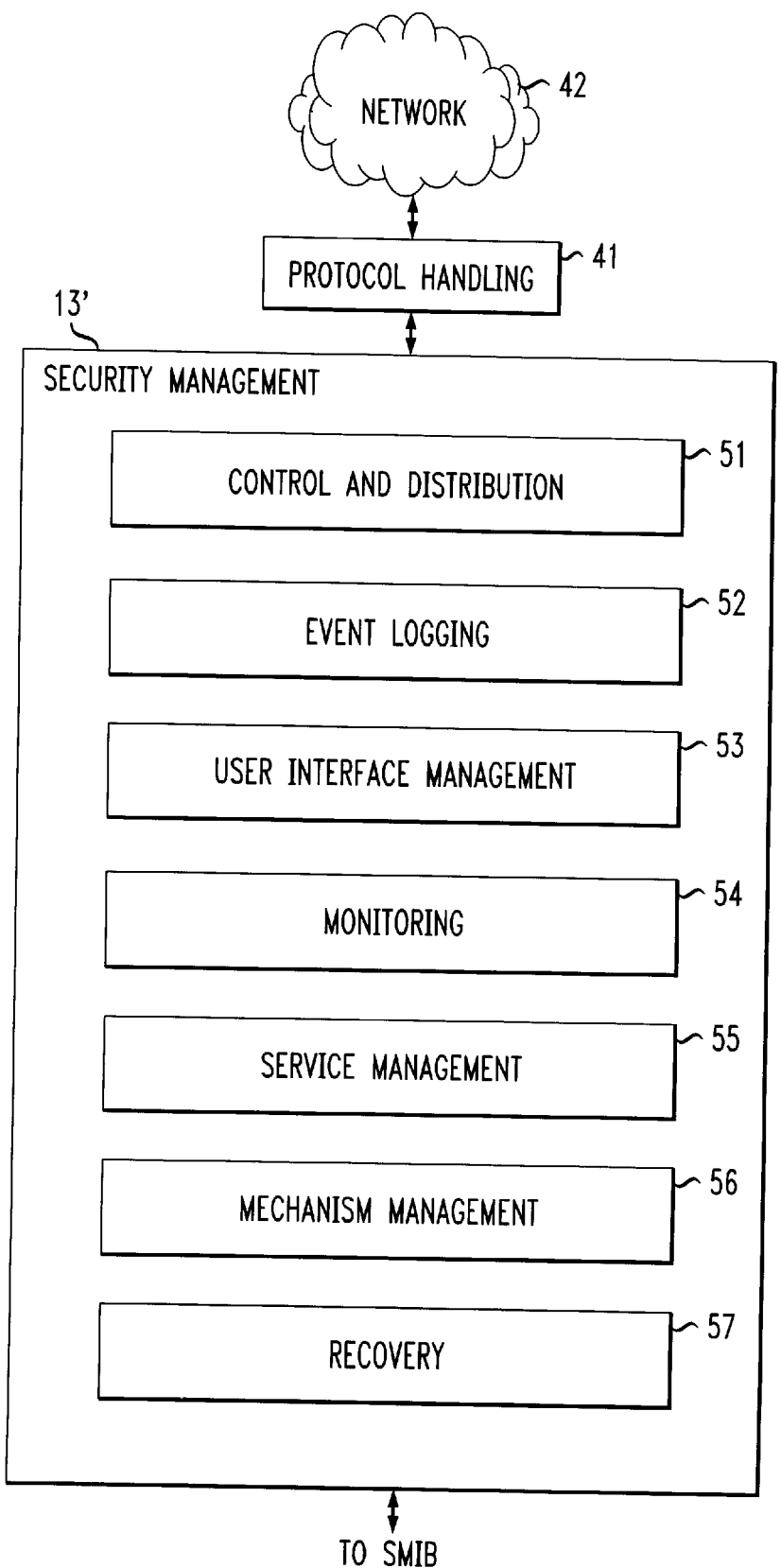
FIG. 3 is a block diagrammatic showing of a preferred implementation of the security management portion of the system according to FIG. 1.

FIG. 3 shows the modules of the security management layer 13' in its preferred implementation with protocol handling module 41 and electronic network 42. These modules include control and distribution module 51, event logging module 52, user interface management module 53, monitoring module 54, security service management module 55, security mechanism management module 56, and recovery management module 57. These modules can be structured as known to one of ordinary skill in the art.

This security management layer 13' is concerned with security aspects which are outside normal scope of security services, but which are needed to support and control security services and mechanisms. Security management function involves: provision of security services, control and distribution of security-related information in real-time and per pre-specified schedules; event logging, both for normal and abnormal situation; administration and management of various modules in lower layers, e.g., parameter management for security mechanisms like cryptographic keys; user interface management; security monitoring for various security services; key and security (state) recovery in case of violation; and interaction establishment between different security management systems through use of appropriate security management protocol(s).

Figure 4:
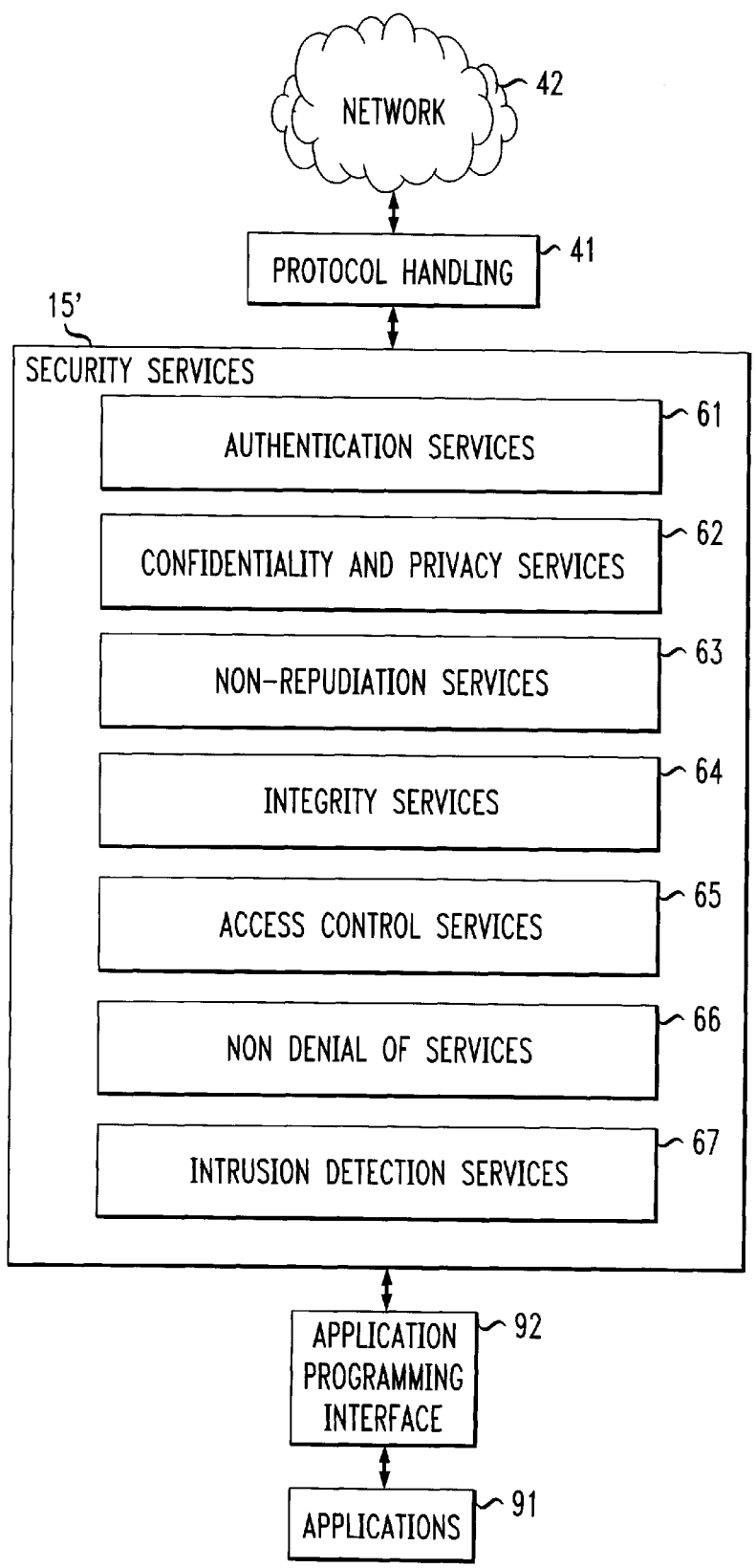
FIG. 4 is a block diagrammatic showing of a preferred implementation of the security services portion of the system according to FIG. 1.

The next subordinate layer 15', the security service function layer, is shown with an illustrative seven modules in FIG. 4. These modules include the authentication service module 61, the confidentiality service module 62, the non-repudiation services module 63, the integrity services module 64, the access control services module 65, the non-denial of services module 66, and the intrusion detection services module 67, all of known type in the art.

This layer provides a platform to implement various security services. Each security service can be designed and implemented as an autonomous self-contained functional module to provide the "plug-and-play" capability. Although, nothing prevents interactions among various service modules, each module is called using appropriate protocols and procedures.

In FIG. 4, the most widely-used security services are shown. ISO standards define the following six basic security services:

Confidentiality, or Confidentiality and Privacy, Service is the protection of transmitted information from passive attacks.

Integrity Service generally provides protection against message modification for connectionless communications, and provides protection against duplication, insertion, modification, reordering, or replay for connection-oriented communications.

Access Control Service is the ability to limit and control the access to host systems and applications via communication links.

Non-repudiation and Accountability Service prevents either sender or receiver from denying a transmitted message.

Authentication Service is concerned with assuring that a communication is authentic.

Non-denial of service is concerned with assuring that prescribed authorized services are available to authorized users.

In addition to these six basic services, the provision of intrusion detection services is a desirable feature.

These are generic groups of services, since each service may be applied in different variations to different entities, situations, and resources. All security services can be implemented in a form of a security library, interfacing to the upper applications by the corresponding Application Programming Interfaces (APIs). In this regard, see FIG. 7 below. In addition, security services such as packet filtering, firewalling, and intrusion detection may be needed to be implemented as an autonomous server in different part of a network.

Figure 5:
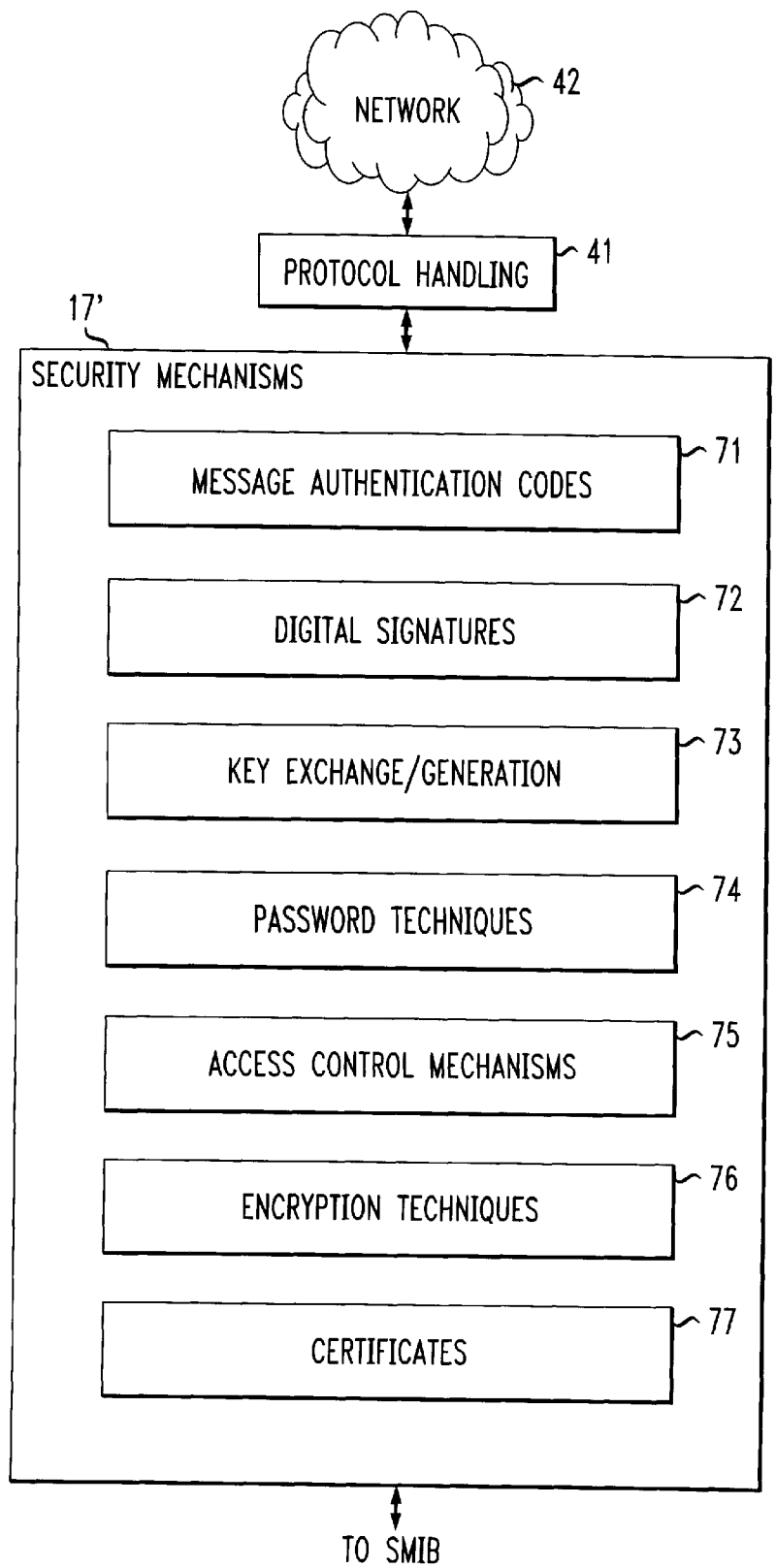
FIG. 5 is a block diagrammatic showing of a preferred implementation of the security mechanisms portion of the system according to FIG. 1.

FIG. 5 shows modules within the security mechanisms layer 17'. The generic modules include the message authentication codes module 71, the digital signatures module 72, the key exchange/generation module 73, the password techniques module 74, the access control mechanisms module 75, the encryption techniques module 76, and the certificates module 77. Within each of these generic modules is a set of specific mechanism modules of known types in the art, but which are not indicated further in FIG. 5. For example, within digital signature module 72 are RSA, El Gamal, Elliptic Curve, and DSS mechanisms.

As mentioned before, there is no single mechanism that will provide all the functions required for each of the security services. In fact, as the number of security services in layer 15 increases, a variety of mechanisms come into play. The layer 17 of the SMS architecture implements various security mechanisms with different efficiencies, degrees of security and computational complexities. For instance, some services may use weak but efficient mechanisms, others may use strong but slower mechanisms. It is also possible to make certain mechanisms mandatory, and others optional. However, cryptographic techniques underlie most of the security mechanisms in use.

This layer 17' can include various generic common modules to be used by the security service function (layer 15). Examples of these modules are:

Public-Key Encryption: RSA, ECC, Rabin, El Gamal algorithms

Symmetric One-Key Encryption: DES, Triple DES, FEAL, IDEA, RC2, RC4, SKIPJACK techniques Message Authentication Code: CBC-MAC, MAA, RIPE-MAC Password techniques, Biometrics mechanisms Digital Signature: DSA mechanism Access Control: access control matrix (ACM), access control list (ACL), conditional access mechanism.

Figure 6:
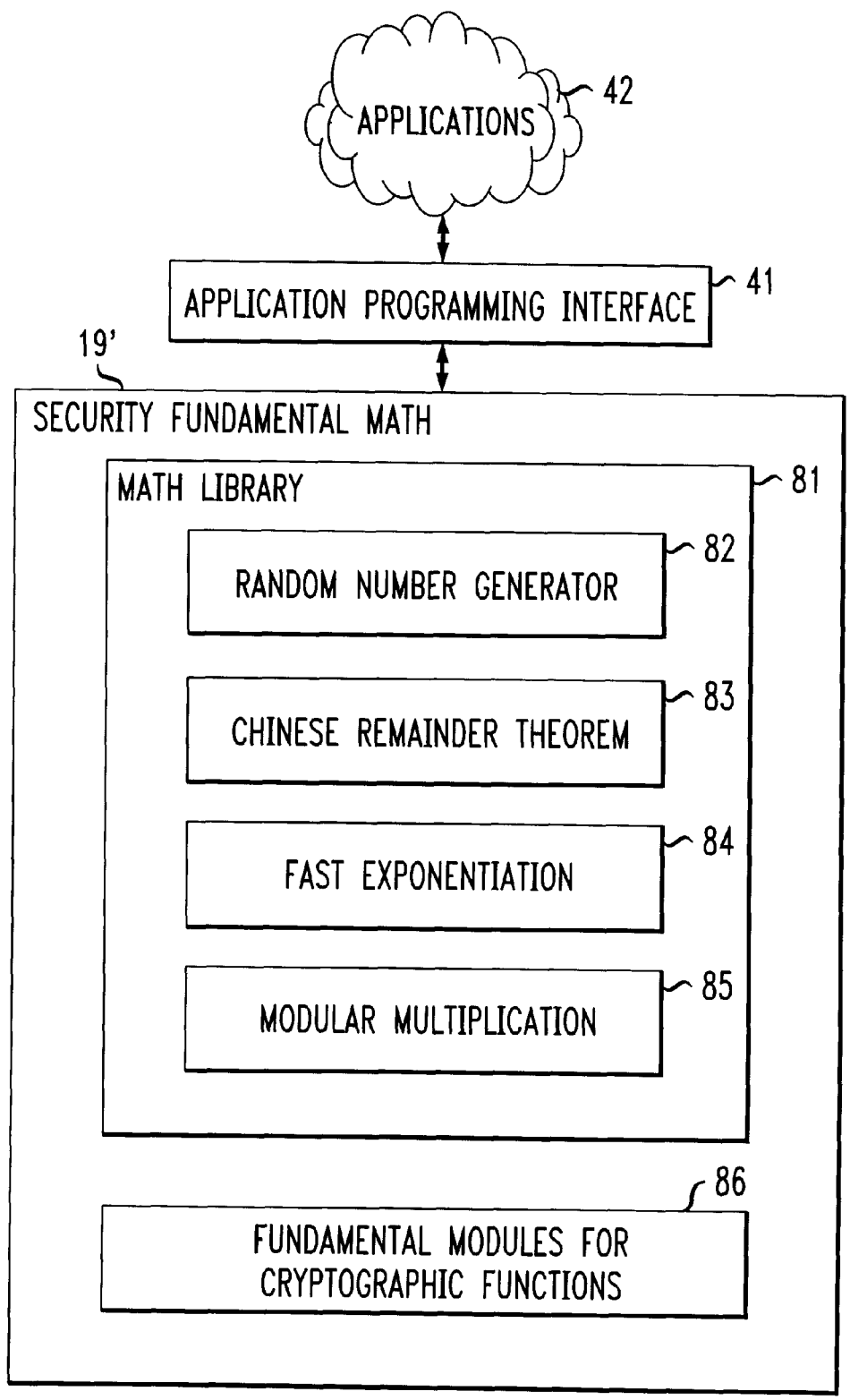
FIG. 6 is a block diagrammatic showing of a preferred implementation of the portion of the system of FIG. 1 providing fundamental security mathematical functions.

The sequence of executing security services and mechanisms, depending on the operational environment and the security perimeter, may be different and results in different security considerations. For example, a digital signature can be generated for a given plaintext message and appended to the message. Then, the plaintext message plus signature can be encrypted using a particular session key. This sequence can easily be reversed. Alternatively, the plaintext message can be encrypted first and then generate a digital signature for the encrypted message. Thus, the order of applying encryption and digital signature mechanisms to the message is dependent on security requirements. SMS provides this flexibility for an end-user or an application. Cryptographic mechanisms are also included in this layer. They include key-exchange, public-key encryption, and symmetric-key encryption, and deserve to be treated as a sub-layer because a number of security service modules (and mechanisms on this layer) relay on the use of conventional encryption. For example, public key certification is a mechanism that required for certificate authorities, and key-exchange/generation, is the fundamental technique required for establishing a session encryption key. Each mechanism, in turn, can contain various algorithms and schemes to be used, based on different mode of operation. For example, a typical MAC module may contain a Cipher Block Chaining MAC (CBC-MAC), MAA, and RIPE-MAC At the lowest or most subordinate of the layers of FIG. 1 are the fundamental security mathematical functions, as shown in FIG. 6. The layer 19' provides a platform to implement basic mathematical operations and algorithms that are used in conjunction with cryptographic techniques. Layer 19' contains elementary atomic modules, as shown in FIG. 6, in a math library 81. These modules are needed for cryptographic algorithms and special protocols. Examples of these general-purpose modules are: random number generator 82, Chinese remainder theorem module 83, fast exponentiation module 84, and modular multiplication module 85, all of known type. Lowest layer 19 also includes fundamental modules 86 for cryptographic functions.

FIG. 7 illustrates an example of the implementation of the layered structure of the invention in the context of a known applications or applications 91. For example, the application could be PGP (Pretty Good Privacy) (not shown). PGP is a freeware providing compatibility, compression, and segmentation for electronic-mails. In addition, PGP provides confidentiality and authentication services.

The interactions between functional modules shown in FIG. 7 will be further explained as follows. Before proceeding to the more complex aspects of interface 92, consider the security management information base 31–39 of FIG. 1. An important component of SMS, or any security management architecture for that matter, is its security management information model. SMS will include a Security Management Information Base (SMIB). The conceptual segments of an SMIB are IDs for network secured resources, user profiles and privileges, secure associations, access control list, and security logs. Note that this concept does not suggest any content or form for the storage of information, its implementation or usage, other than emphasizing the security data needs. Clearly, SMIB must be structured to support implementation of all security services and mechanisms in a computing environment or a communication environment. Also, SMIB must work in a manager/agent relationship to support other MIBs in use. As mentioned above, the SMIB is a repository of all control information and parameters necessary for normal functioning of the security system. The SMIB contains the security profiles of the system/network, security parameters, and logical associations among security entities. At least, a combination of the X.500 and X.509 recommendations could be used.

There are interactions within and amongst the SMS functional layers as well as between the functional layers and the security environment and the SMIB. There are at least three types of transactions present in the SMS:

message interactions, protocols, and interfaces.

These transactions may be explained as follows.

Message Interaction—In order to cooperate, modules in functional layers must mutually communicate. One possibility is that for the communicating layers to send direct instructions to each other and receive the return status. Another high-end possibility would be to use a well-defined protocol between modules in different layers. Therefore, depending on implementation environment, this interfunction communication can be as simple as a "function call" in C Language or an inter-object message, or can be as complicated as a secure protocol requiring full-fledge protocol definition. In either case, message sets must be clearly defined. Thus, in FIG. 7, the internal communication between components of SMS 93 , e.g., authentication service 94, confidentiality service 95, access control service 96, integrity service 97, non-repudiation service 98, and non-denial of service 99, can be unrestricted and facilitated according to user needs or can be highly regulated according to a layered hierarchy.

Security Protocol—Security protocols are generally defined as interactions between the security function modules and the securing entities (users, applications, other security modules, etc.). The SMS needs security protocols for communication with i) user, ii) security domains, i.e., LAN, WAN, managing applications, Network Management Systems (NMS) stack, etc., iii) SMIB, and iv) host operating system. Note that security protocols are not included in the functional architecture of SMS, because they are means to implement security services rather than tasks to implement security. However, if a module uses services of one or more security protocols, security protocol handling capabilities need to be provided in that layer.

Interface—Thus, as shown in FIG. 7, the SMS must be able to interface with various applications 91, including operations environments. The interfaces 92 should be designed between SMS 93, including its own components, such as SMIB, and the protected applications 91, including the involved host machines. It is important to notice that the SMS 93 is accessible from any layer of a communication protocol that needs security services. For example, it is possible for a Transport Layer to request data encryption services from SMS 93. This type of interface requirements can be implemented using an appropriate Application Interface 92. This API module 92 is so designed as to be able to handle these requests and put them into the format required by the SMS 93. Typically, the API modules 92 for various applications and operational environment will differ, so each application needs its own interface module to the SMS 93.

Figure 8:
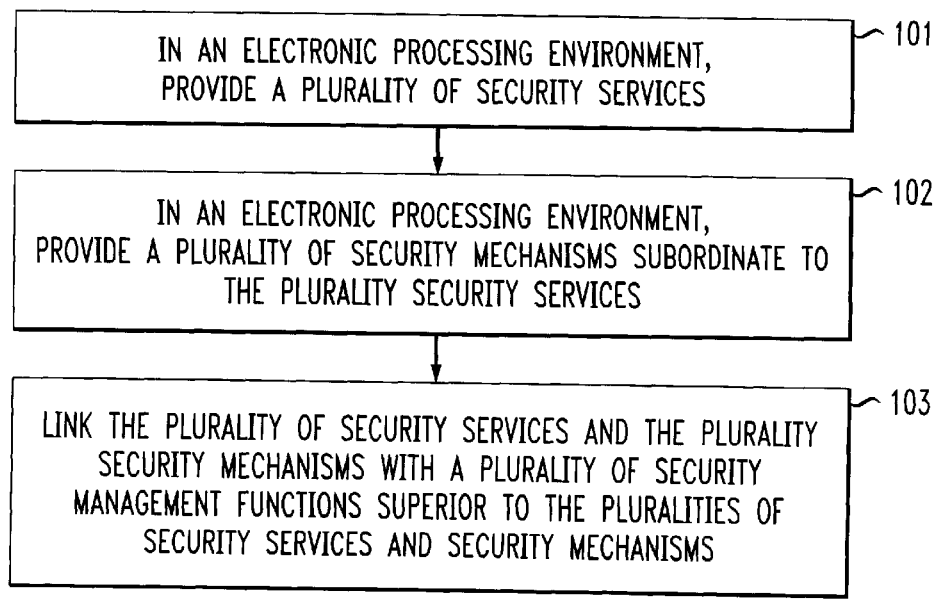
FIG. 8 is a flow diagram of a preferred method of invention implemented in the system of FIG. 1.

FIG. 8 provides a summary of the present invention. To provide a comprehensive security management system, the security system must provide at least the following steps, in an appropriate electronic processing environment: the step 101 of providing a plurality of security services, the step 102 of providing a plurality of security mechanisms subordinate to the plurality of security services, and the step 103 of linking the plurality of security services and the plurality of security mechanisms with a plurality of security management function superior to the pluralities of security services and security mechanisms.

What is claimed is:

1. A method of managing security in an electronic network, comprising the steps of:

providing a plurality of security services;

providing a plurality of security mechanisms;

linking the services and mechanisms with a plurality of security management functions; and linking the services, mechanisms, and security management functions with at least one security policy.

2. The method according to claim 1 additionally comprising the step of supporting a plurality of security protocols in the electronic network while maintaining transparency for message exchange.

3. A method for managing security in an electronic network, comprising the steps of:

providing five functional hierarchical layers and one protocol handling access to the layers, the five functional layers including, from the base, fundamental security primitives, security mechanisms, security services, security management functions, and security policies;

providing a security management information base segmented according to the five functional layers;

enabling exchange of messages between layers; and providing a plurality of independent modules in at least one of the layers, the enabling step enabling exchange of messages between the modules.

4. The method according to claim 3, wherein the modules are partitioned according to respective ones of the plurality of security services or according to respective ones of the plurality of security mechanisms.

5. A system for managing security in an electronic network, comprising:

means for providing a plurality of security services;

means for providing a plurality of security mechanisms;

means for linking the security services providing means and the security mechanisms providing means with an interface; and means connected to said interface for providing a plurality of security management functions;

wherein the linking means comprises means for linking the security services providing means, the security mechanisms providing means, and the security management functions providing means with at least one security policy.

6. The system according to claim 5 additionally comprising means for supporting a plurality of security protocols in the electronic network while maintaining transparency for message exchange.

7. A system for managing security in an electronic network, comprising:

means for providing five functional hierarchical layers and one protocol handling access to the layers, the five functional layers including, from the base, fundamental security primitives, security mechanisms, security services, security management functions, and security policies;

means for providing a security management information base segmented according to the five functional layers;

means for enabling exchange of messages between layers; and a plurality of independent modules in at least one of the layers, the enabling means including means for enabling exchange of messages between the modules.

8. The system according to claim 7, wherein the modules are partitioned according to respective ones of the plurality of security services or according to respective ones of the plurality of security mechanisms.

* * * * *